United States Patent [19]

Shelley

[11] Patent Number: 5,031,333

[45] Date of Patent: Jul. 16, 1991

[54] TEMPLATE FOR THEATER LIGHTING

[76] Inventor: Steven L. Shelley, 228 Eleventh St., Brooklyn, N.Y. 11215

[21] Appl. No.: 471,157

[22] Filed: Jan. 26, 1990

[51] Int. Cl.[5] .......................... B43L 13/20; G01B 3/14

[52] U.S. Cl. .......................................... 33/562; 33/565; 434/87

[58] Field of Search .................. 33/562, 563, 565, 564, 33/566, 1 B, 1 G, 1 C, 13, 403, 474, 476, 477; D19/37, 40; 434/87, 164

[56] References Cited

U.S. PATENT DOCUMENTS

| | | | |
|---|---|---|---|
| D. 163,302 | 5/1951 | Martin . | |
| D. 192,748 | 5/1962 | Brockman . | |
| D. 200,664 | 3/1965 | Kellinger et al. . | |
| 239,691 | 4/1881 | Appleton . | |
| D. 268,597 | 4/1983 | Spence . | |
| D. 293,301 | 12/1987 | Deering . | |
| 307,233 | 7/1914 | Bernard . | |
| 392,143 | 10/1888 | Wright . | |
| 555,287 | 2/1896 | Horrigan . | |
| 647,339 | 4/1900 | Thompson . | |
| 651,037 | 6/1900 | Hawkins . | |
| 738,130 | 9/1903 | Waymire . | |
| 776,897 | 12/1904 | Ferris . | |
| 777,407 | 12/1904 | Early . | |
| 777,770 | 12/1904 | Barnes . | |
| 844,157 | 2/1907 | Loughborough . | |
| 844,243 | 2/1907 | Breul . | |
| 893,085 | 7/1908 | Loughborough . | |
| 1,043,789 | 11/1912 | Whalen . | |
| 1,135,259 | 4/1915 | Cokely . | |
| 1,139,229 | 5/1915 | Requa | 33/476 |
| 1,154,673 | 9/1915 | Van Ness . | |
| 1,182,638 | 5/1916 | Carnahan . | |
| 1,266,010 | 5/1918 | Golden . | |
| 1,498,870 | 6/1924 | Fox . | |
| 1,692,149 | 11/1928 | Castan . | |
| 1,723,517 | 8/1929 | McFadden . | |
| 1,808,705 | 6/1931 | Owen, Jr. . | |
| 1,845,449 | 2/1932 | Smith . | |
| 1,933,880 | 11/1933 | Tiheuko . | |
| 1,993,347 | 3/1935 | McMillan . | |
| 2,003,172 | 5/1935 | Burt . | |
| 2,016,489 | 10/1935 | Escalante . | |
| 2,043,729 | 6/1936 | Bilder . | |
| 2,080,620 | 5/1937 | Martin | 33/565 |
| 2,190,071 | 2/1940 | Keppers . | |
| 2,487,673 | 11/1949 | Roper | 33/565 |
| 2,542,537 | 2/1951 | Klemm . | |
| 2,579,857 | 12/1951 | Premo | 33/565 |
| 2,624,117 | 1/1953 | Paci . | |
| 2,858,612 | 11/1958 | Verrett . | |
| 2,958,132 | 11/1960 | Hartbauer . | |
| 3,279,074 | 10/1966 | McQuaid . | |
| 3,460,261 | 8/1969 | Frey | 33/403 |
| 3,465,445 | 9/1969 | Fisher . | |
| 3,604,118 | 9/1971 | Miller . | |
| 3,795,053 | 3/1974 | Burke | 33/13 |
| 3,855,924 | 12/1974 | Morse, Jr. | 33/563 |
| 4,125,658 | 11/1978 | Miles | 33/563 |
| 4,129,948 | 12/1978 | Hatter et al. | 33/27.03 |
| 4,158,257 | 6/1979 | Kupperman et al. . | |
| 4,173,829 | 11/1979 | Khait . | |
| 4,235,022 | 11/1980 | Fernandez | 33/474 |
| 4,353,166 | 10/1982 | Kettlestrings . | |
| 4,403,423 | 9/1983 | Ford et al. | 33/432 |
| 4,443,953 | 4/1984 | Gregory | 33/403 |
| 4,490,921 | 1/1985 | Woods et al. | 33/476 |
| 4,545,130 | 10/1985 | Corsette | 33/474 |
| 4,599,805 | 7/1986 | Padilla | 33/464 |
| 4,779,346 | 10/1988 | Schafer | 33/1 B |

FOREIGN PATENT DOCUMENTS

| | | | |
|---|---|---|---|
| 195987 | 2/1938 | Switzerland | 33/474 |

OTHER PUBLICATIONS

S. Shelley, Field Template Brochure, 1989.

S. Shelley, A Guide for Use of the Field Template, 1989.

*Primary Examiner*—William A. Cuchlinski, Jr.

*Assistant Examiner*—C. W. Fulton

*Attorney, Agent, or Firm*—Pennie & Edmonds

[57] ABSTRACT

A drafting template which facilitates prealignment of multiple symbols onto vertical and horizontal axes. The distance between symbols is generallly determined by a predetermined scale which is associated with the template. A grid pattern and four double rows of holes around the edge of the grid are used to place template cutouts in the proper location on the drawing, so that the symbols are drawn in the proper location. Additionally, four apertures associated with each symbol define the vertical and horizontal axis of the symbol, and four indicia, associated with each symbol, define a predetermined rotation of the template required to draw a symbol at a predetermined angle.

20 Claims, 9 Drawing Sheets

TEMPLATE FOR THEATER LIGHTING

TECHNICAL FIELD

This invention relates to drafting instruments, and more particularly, to drafting templates that utilize cutout symbols which represent objects or concepts for use in the design of theater lighting.

BACKGROUND ART

Heretofore various patents describing flat sheets of plastic with holes adapted to be used as non-related symbols, have been disclosed as devices for drawing symbols on a central axis. Most drafting devices in common use typically have symbols aligned to one edge of the symbols, rather than aligned to a central axis. Those devices typically require the user to define the central axis of the symbols after first drawing a line to define a plane, and to constantly adjust the devices vertically or horizontally, so that unrelated symbols may be drawn with the vertical or horizontal axis of the symbols are all centrally located on that line.

Most drafting devices in common use also typically have randomly spaced symbols. To determine the distance between symbols while drafting requires either moving the device so that a scale rule printed on the device becomes applicable, or utilizing a separate measuring device such as a ruler or scale, to determine the distance between a drawn symbol and a second symbol yet to be drawn.

All such devices known to applicant have a major disadvantage in that it is extremely time-consuming for the user, after tracing the first symbol, to determine the distance between symbols, mark the distance, and then adjust the device so as to align the second symbol to be traced in matching alignment to the first symbol. This requires a great deal of time, patience, and attention on the part of the draftsperson in order to maintain the accuracy of the alignment of the symbols on the same plane, as well as to maintain the accuracy of distance between each traced symbol.

Furthermore, if a draftsperson desires to draw a symbol at a predetermined angle, such as 45° for example, it is necessary to mark the central axis point of the desired symbol on the paper, place an additional tool, such as a 45° triangle, onto the paper, adjust the triangle and the device so that the symbol in the device is aligned with the central axis point on the paper, and draw the angled symbol.

Still furthermore, if a draftsperson desires to mark the central axis point of a symbol not yet drawn, most devices commonly used typically require the draftsperson to mark the axis point, with a pen or pencil, inside the to-be-drawn symbol. This procedure requires additional time, to allow for erasure of the mark in the later stages of the drafting. This also requires more concentration of the part of the draftsperson to insure accuracy of the erasure of the mark, without smudging the symbol, which would then require complete erasure and redrawing of the symbol.

Accordingly, there is a need for a template which in addition to facilitating the illustration of symbols, can also be used to space the symbols by predetermined measured intervals, as well as to allow illustration of the symbols at predetermined angles of orientation.

SUMMARY OF THE INVENTION

The primary object of the invention is to provide a drafting instrument of a generally planar, transparent plastic member for the prealignment of the cutout symbols onto horizontal and vertical axes.

Another object of the invention is to provide a drafting instrument for defining the distance between cutout symbols with a predetermined scale which may be represented by the combination of a gridwork pattern and four series of double rows of equidistant holes or dots.

A further object of the invention is to provide a drafting instrument that has four holes surrounding each cutout symbol and defining the vertical and horizontal axes. These holes are used to mark the vertical or horizontal axis of the symbol, without a pen or pencil mark being made inside the area of the symbol to be drawn.

A still further object of the invention is to provide a drafting instrument using the gridwork pattern to define the location of four black dots surrounding each cutout symbol which indicate the rotation of the template required to draw symbols at a 45° angle.

The invention enables the user to quickly draw symbols that, when drawn, will be visually presented on the same plane, either horizontally or vertically parallel to each other, or at a 45° angle. The invention also enables the user to accurately define the distance between two symbols, without having to independently measure the distance with a scale rule or other measuring device.

One aspect of the invention relates to a template for the drafting and measuring of symbols, which comprises a generally planar member adapted to be disposed on a substrate and defining a plurality of apertures forming symbols therein; first means for determining the spacing between the symbols according to a first predetermined scale; first registration means associated with a plurality of the symbols for selective orientation of each of the symbols at a predetermined angle; and second registration means associated with a plurality of symbols for selective alignment of one symbol with respect to an adjacent symbol.

The planar member is preferably transparent and has a substantially rectangular perimeter. Also, the perimeter includes means for determining distance thereof. Preferably, the distance determining means extends in opposite directions on opposite sides of the rectangular perimeter, and includes a scaled ruler.

The template may further comprise second means for determining the spacing between the symbols according to a second predetermined scale. Such second spacing determining means comprises a plurality of apertures in the planar member, wherein the apertures are aligned in two staggered rows and the second predetermined scale is smaller than the first predetermined scale.

The first spacing determining means may include a plurality of linear indicia, such as in the form of a plurality of horizontal and vertical lines. Some of the horizontal and vertical lines may be wider or bolder than the remaining lines to serve as more commonly used distances or spacings.

The first registration means may comprise a plurality of apertures oriented about the symbols, wherein the apertures are positioned between adjacent symbols such that a single aperture serves two adjacent symbols. Also, the second registration means may comprise a plurality of indicia oriented about said symbols, wherein the indicia are positioned between adjacent symbols such that at least one of the indicia serves two adjacent symbols.

Another embodiment of the invention relates to a template for the drafting and measuring of symbols, which comprises a generally planar transparent member having four external edges forming a rectangle adapted to be disposed on a substrate and defining a plurality of cut out symbols therein; a grid pattern upon the template, in a predetermined scale, with a first spacing between symbols represented by first bold lines, and a second spacing of smaller increments within the first spacing being represented by second lines; a scale upon a first edge of the template for defining the predetermined scale illustrated by the grid pattern; double rows of apertures cut out of the template, located at the first edge of the grid pattern, in a predetermined scale, representing further smaller spacing increments within the first spacing between symbols; four indicia at 45°, 135°, 225°, and 315° relative to each symbol, each opposite pair of indicia defining the rotation of the template required to draw a symbol at an angle of 45° or multiples thereof without additional devices; and four apertures at 0°, 90°, 180°, and 270° arranged about each symbol for defining the vertical and horizontal axis of the symbol.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENTS

Figure 1:
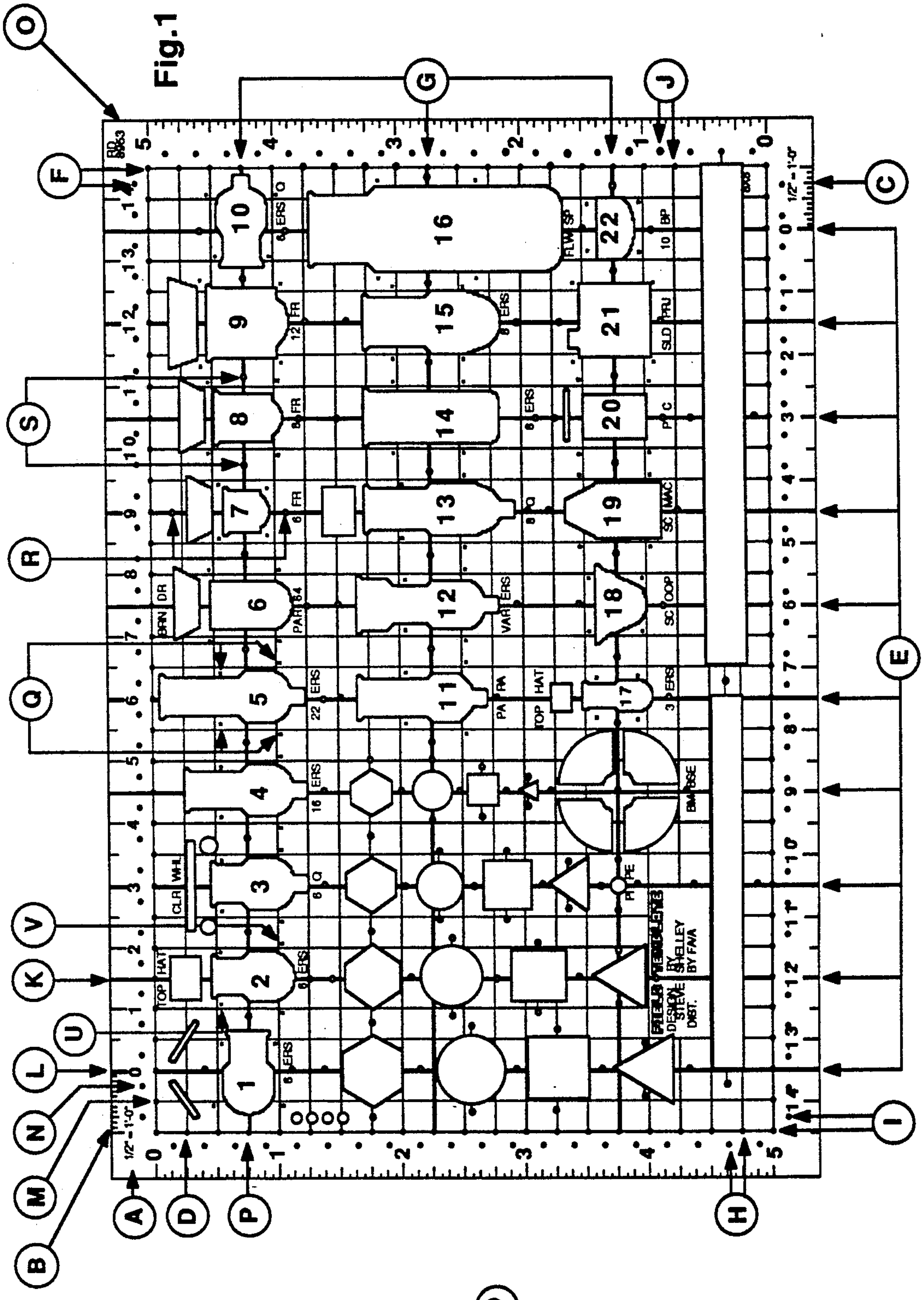
FIG. 1 is a plan composite view of the device, showing all cutout symbols, cutout holes, heat stamped gridwork, and heat stamped symbol identification.

Specifically, the present invention relates to a thin, flat, transparent rectangle constructed of a plastic, such as polystyrene, with symbols and holes cut out of the plastic. The gridwork, scales, and 45° angle dots are preferably heat stamped onto the plastic. The top and bottom edges bear markings and numbers to define a scale, in this case ½"=1'-0", on ¼" (6") centers. Also, in this invention, the typical premeasured horizontal distance of 18" is defined by a wider line, while the other 6" increments are indicated by thinner lines. The scale extends throughout the rectangle as a gridwork pattern. Four double rows of holes on the top, bottom, left, and right sides of the rectangle provide further definition of scale, indicating 3" increments. The four black dots which surround each symbol, define the rotation of the device necessary to draw the symbol at a 45° angle. These dots are oriented at 45°, 135°, 225° and 315° about the symbol, while four holes oriented at 0°, 90°, 180° and 270° about the symbol are used for horizontal or vertical alignment of adjacent symbols.

The combination of these elements provides a device which will enable a user to quickly draft non-related symbols on a defined plane with accurate predefined distances to one another without the need for additional tools or equipment. Furthermore, this template also allows the draftsperson to draw symbols at 45° angles without the assistance of additional tools or equipment.

The device of the present invention is illustrated generally in FIGS. 1-6 of the drawings. As shown, it includes a plastic template body A with a ½"=1'-0" scale B running left to right on the top, and a ½"=1'-0" scale C running right to left on the bottom. This reversal of the scales from top to bottom allow for measurements to be made on a drawing from a centerline to right, or a centerline to left, without necessitating the 180° rotation of the template. All further increments are based upon this ½" scale.

The gridwork D, heat stamped into the main body of the template, is separated into 6" (i.e., ¼ inch) increments. The ten (10) bold vertical axis lines E are prespaced 18" (i.e., ¾ inch) apart, which in this specific case, is a typical desired distance between symbols. The double row of horizontal holes F and I, at the top and bottom of the template respectively, are horizontally located on 3" (i.e., ⅛ inch) increments. The three (3) bold horizontal axis lines G are prespaced 3' (i.e., 1½ inches) apart. The double row of vertical holes H and J on the left and right sides of the template, are vertically located on 3" (i.e., ⅛ inch) increments. The symbols 1 thought 22, which are cut out of a flat transparent thermoplastic material, such as polystyrene, indicate specific theatrical lighting fixtures, which are prealigned between the bold vertical E and bold horizontal G axis lines. The four black dots Q surrounding symbol are the 45° angle dots. The horizontal axis holes R are located above and below each symbol, while the vertical axis holes S are located to the left and right of each symbol.

In order to use the device, the draftsperson first defines a plane by drawing a straight line on the paper, using a tool such as the edge of the device, a straight edge, or the like. The device is then aligned so that one of the horizontal axis lines of the device overlays the drawn straight line. A symbol is then drawn on the paper. The device is then shifted to one side or the other, so that the first symbol is aligned with the bold vertical line on the device of the next adjacent symbol. A second symbol can then be drawn which is prespaced 18" from the first symbol.

If the first symbol is aligned with the first light vertical line farther away from the bold vertical line, the second symbol, when drawn, will be prespaced 24" from the first unit. If the first symbol is aligned with the first small hole farther away from the bold vertical line, the second symbol, when drawn, will be prespaced 21" from the first unit. Also, when the draftsperson marks a center axis point of a symbol, the device can be rotated so that two of the black dots surrounding the symbol are aligned to the drawn straight line, and a symbol can be drawn at a 45° angle.

The construction of this invention is arrived at through five steps. First, a scale is selected to define the size of the symbols on the template. This scale is placed at the edge of the template as a reference. Second, the spacing amount required to translate one symbol from a previous symbol is determined to define the distance on the template between symbols, and the placement of parallel bold lines which relate to the scale at the edge of the template. Third, additional bold lines are added, intersecting the previous parallel bold lines at a 90° angle, to define the central axis point of each symbol. Fourth, smaller increments of distance in scale are determined, which are then displayed as non-bold lines between the aformentioned bold lines. This configuration becomes defined as a grid. Each intersection of a bold or non-bold line and the edge of the grid marks the location of a hole, resulting in a first series of rows of holes. An even smaller subdivision of the scale is then determined and located between and a short distance from the first rows of holes, to produce a second series of rows of holes parallel the first series of rows of holes. The symbols are now arranged in groups of classifications on the temple so as to clearly display the symbols while retaining the integrity of the plastic. Holes are placed relative to each symbol and the grid to define the horizontal and vertical axis of each symbol. Small markings are placed on the plastic, relative to each symbol and the grid to define the rotation of the template required to draw a symbol at a desired angle.

It will be appreciated that the device, as described herein, depicts only one version of the invention which is designed to operate under the U.S. Standard System of Weights and Measures in inches and by fractions of 1/12th of an inch thereof. Additional versions of the device embody the same basic principles of design, and each provides the same pattern of a gridwork with bold and thin vertical and horizontal lines defining centered axes for symbols, and rows of small holes defining fractional units of measurement. These alternate embodiments of design may encompass a version in metric scale (by meters and centimeters), a version in U.S. Standard by inches and decimals in tenths of an inch, and a version in U.S. Standard by inches in other scales, including, but not limited to ¼"=1'-0", ¾"=1'-0", or ⅜"=1"-0".

The template can be used to depict lighting symbols on paper or any other substrate. The term "paper" is used herein to include other substances such as vellum, drafting paper, butcher block paper, etc.

Similarly, the phrase "heat stamp" is used to define the preferred method for providing guide lines and rotation dots on this template, it being understood that the process used could be stenciling, etching, etc.

The template may be made of any plastic material, with transparent thermoplastic materials such as polystyrene being preferred. In addition, this template can be made of cardboard, heavy paper, metal or any other suitable generally planar member. The template must have sufficient strength and structural integrity to hold together after the holes and symbols are cut out therefrom.

Although the symbols described herein are preferably in the form of lighting fixtures, it will be appreciated that other objects may be formed as desired by one skilled in the art, and the invention provides a novel way for aligning, positioning and orienting such objects with respect to each other and at predetermined spacings.

The specific templates illustrated disclose four discrete dots around each symbol. Those skilled in the art will recognize, however, that it is possible to arrange these dots around adjacent symbols such that the two dots between symbols could be used to serve each symbol, thus avoiding duplication of dots. The same is true for the four holes which are oriented about each symbol, and the drawings show that a single hole between adjacent symbols can be used for each.

While draftpersons will immediately recognize the versatility of the drafting template described herein, the following examples further illustrate the specific utility of the template of the invention.

EXAMPLE 1

DETERMINING SYMBOL SPACING BY MARKING CENTERS WITHOUT ADDITIONAL MEASURING DEVICES

Figure 7:
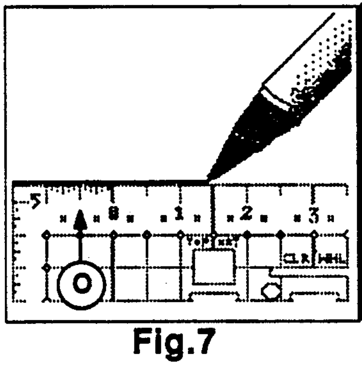
FIGS. 7-9 are expanded views of a portion of the device illustrating a three step process for measuring distances without additional drafting equipment.
Figure 8:
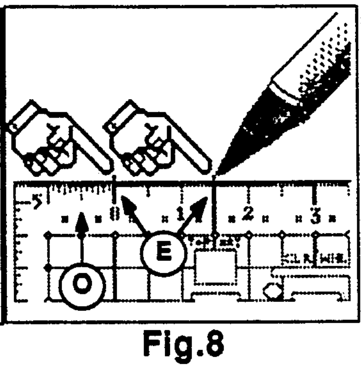
Figure 9:
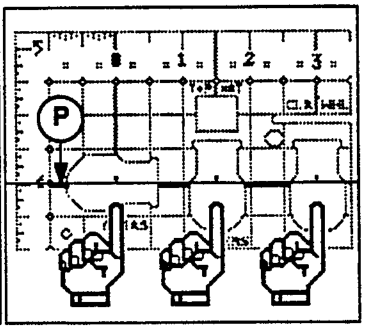

To measure typical distances without the need for a ruler or a scale rule, the procedure is as follows:

Referring to FIG. 7, draw a line using a pen or pencil against the tip edge of the template 0, to define a plane or location on a substrate such as paper. Referring now to FIG. 8, without moving the template, place the pen or pencil point on the line, and mark dots at the intersection of the top edge of the template 0 and the bold vertical lines E, which define 18" centers. Referring now to FIG. 9, raise the template so that horizontal axis line P overlays the drawn line, and the vertical bold lines E are aligned with the dot previously created by the pen or pencil. Symbols can now be drawn on a central axis at 18" intervals.

Figure 10:
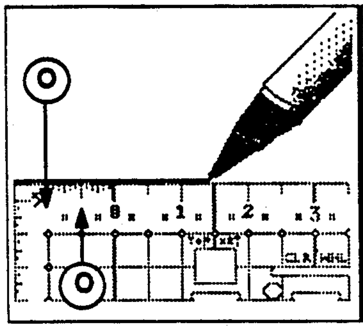
FIGS. 10-12 are expanded views of a portion of the device illustrating an alternate three step process for measuring distances without additional equipment.
Figure 11:
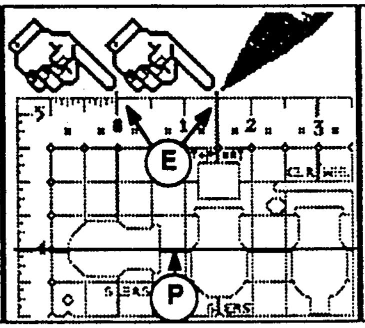
Figure 12:
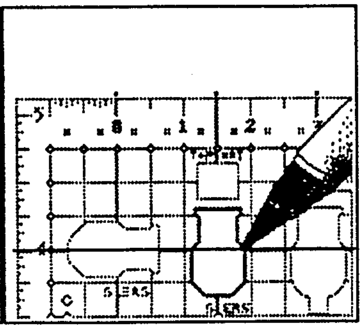

To reduce the amount of erasure required inside of symbols after symbols are drawn, an alternate method may be executed. Referring to FIG. 10, draw a line using a pen or pencil against the top edge of the template 0, to define a plane or central axis on a piece of paper. Referring now to FIG. 11, raise the template so that horizontal axis line P overlays the drawn line, and mark dots at the intersection of the top edge of the template 0 and the bold vertical lines E with a pen or pencil, which define 18" centers. Referring now to FIG. 12, symbols can now be drawn on a central axis at 18" centers.

EXAMPLE 2

DETERMINING SYMBOL SPACING WITHOUT MARKING CENTERS OR REQUIRING ADDITIONAL MEASURING DEVICES

Figure 13:
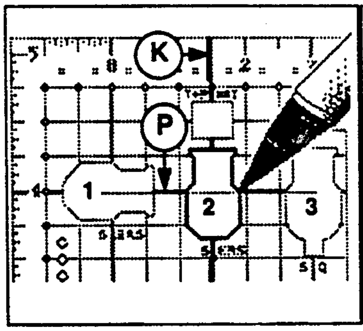
FIGS. 13-15 are expanded views of a portion of the device illustrating one method for drawing symbols 18" apart without having to first mark the centers of the symbols.
Figure 14:
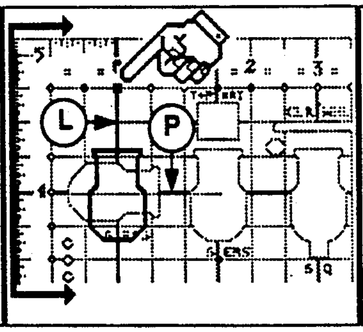
Figure 15:
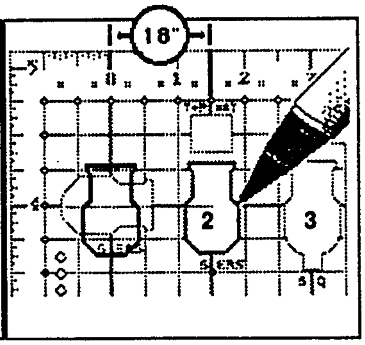

To draw symbols with a predefined distance of 18" without marking centers or requiring additional measuring devices, the procedure is as follows. Draw a line using a pen or pencil against the top edge of the template 0, to define a plane or central axis on a piece of paper. Referring to FIG. 13, raise the template so that horizontal axis line P overlays the drawn line, and draw the shape of symbol 2, which is aligned with bold vertical line K. Referring now to FIG. 14, slide the template to the right, so the vertical center of drawn symbol 2 is aligned with bold vertical line L, while horizontal axis line P still overlays the drawn line. Referring now to FIG. 15, draw a second shape of symbol 2, which is now centered on the same axis and prespaced 18" from the first drawn symbol 2.

Figure 16:
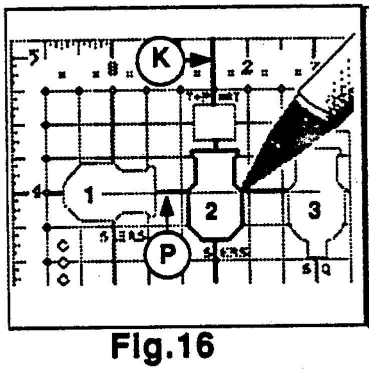
FIGS. 16-18 are expanded views of a portion of the device illustrating one method for drawing symbols 24" apart without having to first mark the centers of the symbols.
Figure 17:
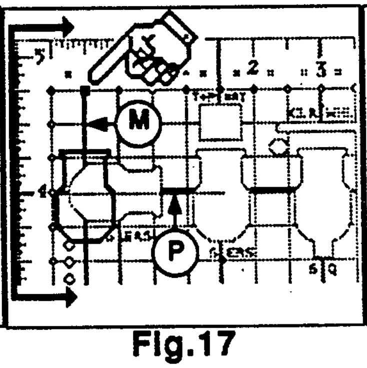
Figure 18:
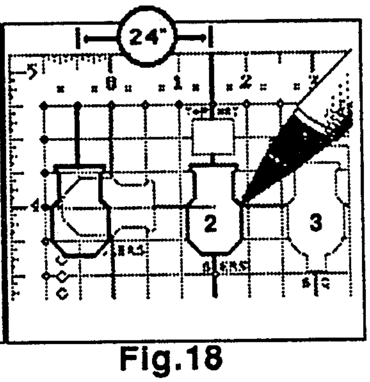

To draw symbols with a predefined distance of 24" without marking centers or requiring additional measuring devices, the procedure is as follows. Draw a line using a pen or pencil against the top edge of the template 0, to define a plane or central axis on a piece of paper. Referring to FIG. 16, raise the template so that horizontal axis line P overlays the drawn line, and draw the shape of symbol 2, which is aligned with bold vertical line K. Referring now to FIG. 17, slide the template to the right, so the vertical center of drawn symbol 2 is aligned with light vertical line M, while horizontal axis line P still overlays the drawn line. Referring now to FIG. 18, draw a second shape of symbol 2, which is now centered on the same axis and prespaced 24" from the first drawn symbol 2.

Figure 2:
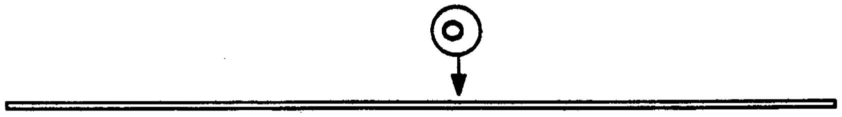
FIG. 2 is an elevational view, in cross section, of FIG. 1.
Figure 3:
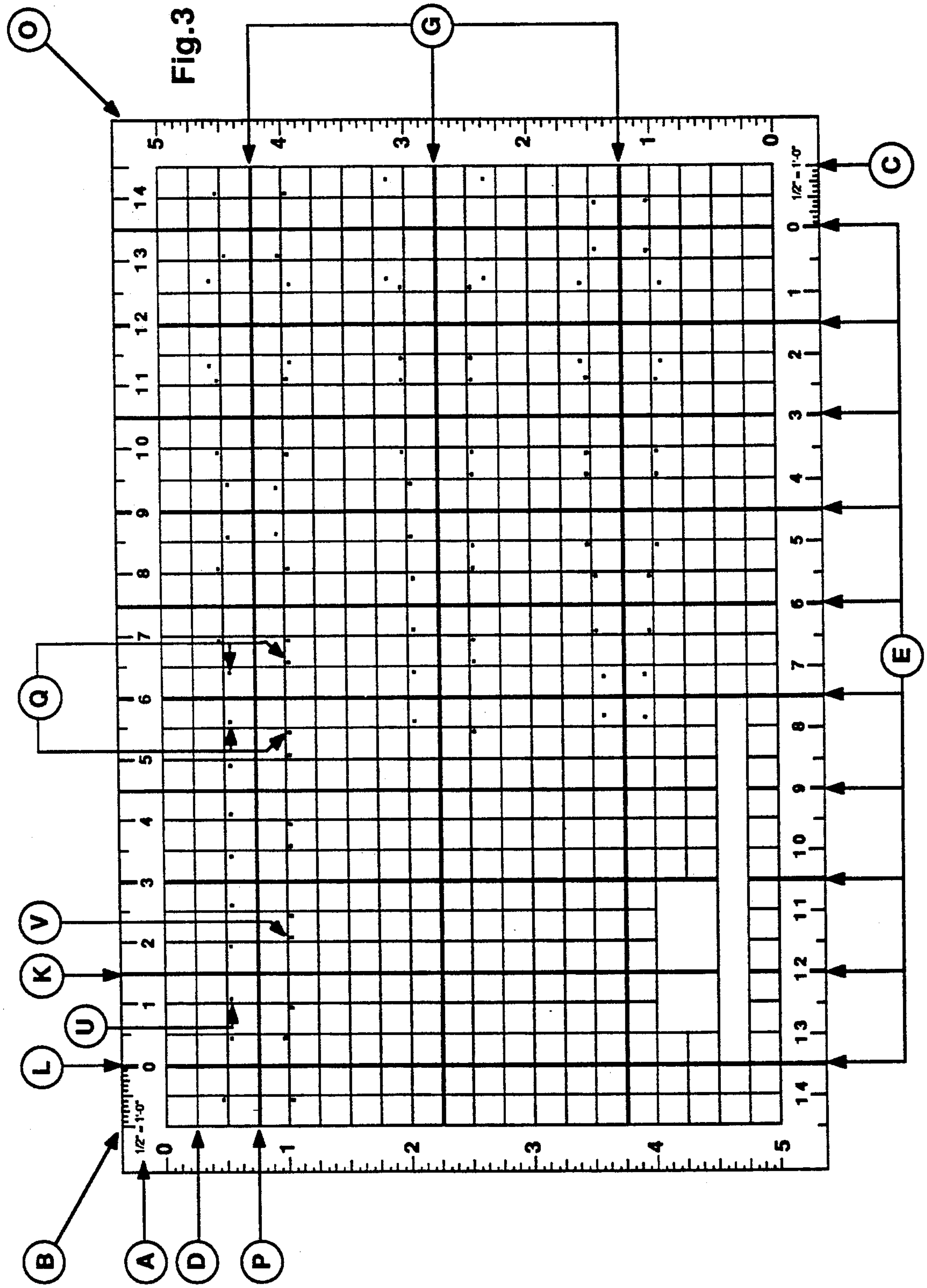
FIG. 3 is a plan view of the device showing only the scales, the gridwork pattern, and the 45° angle dots which are heat stamped onto the plastic.
Figure 4:
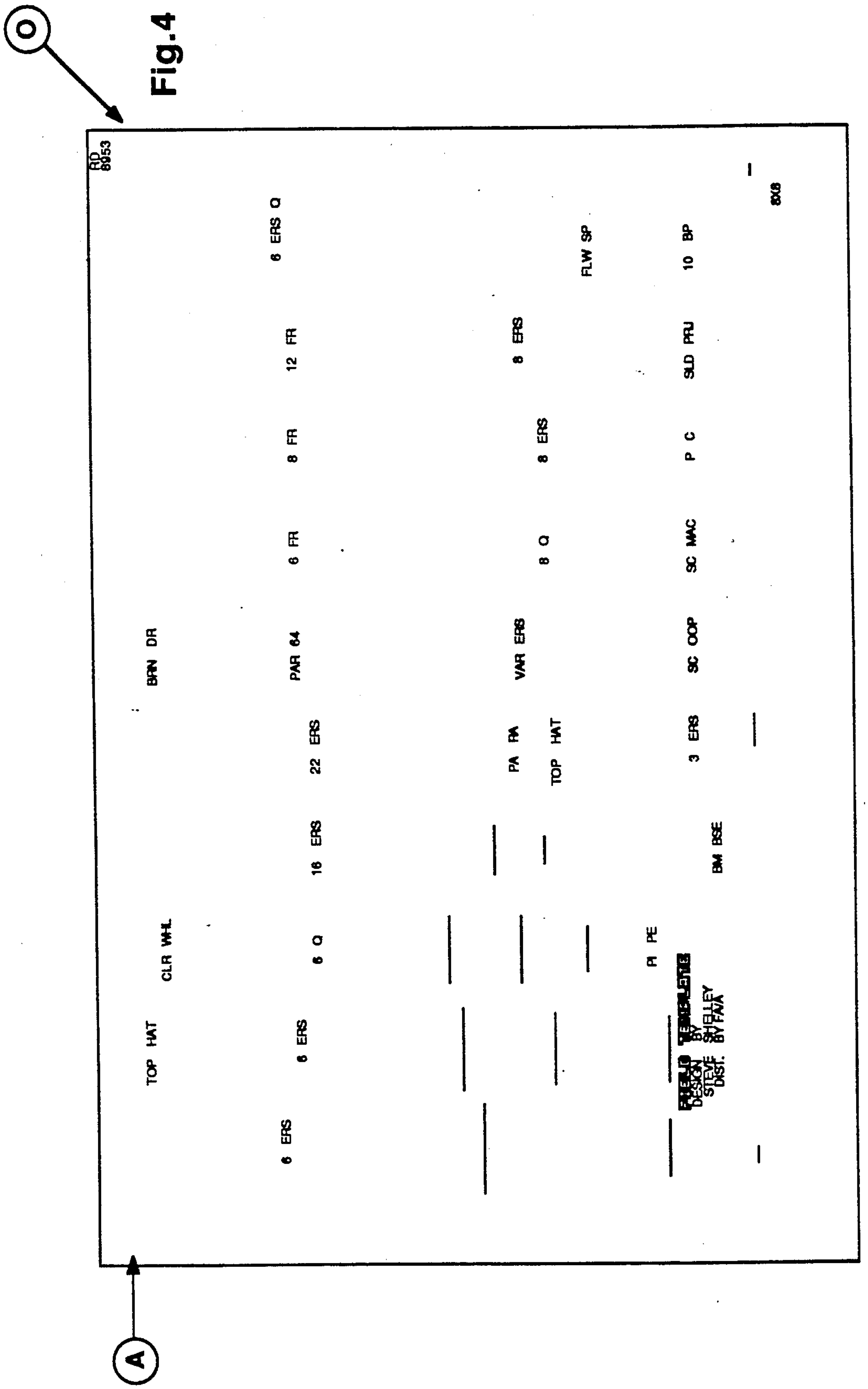
FIG. 4 is a plan view of the device showing only symbol identification and ancillary information heat stamped onto the plastic.
Figure 5:
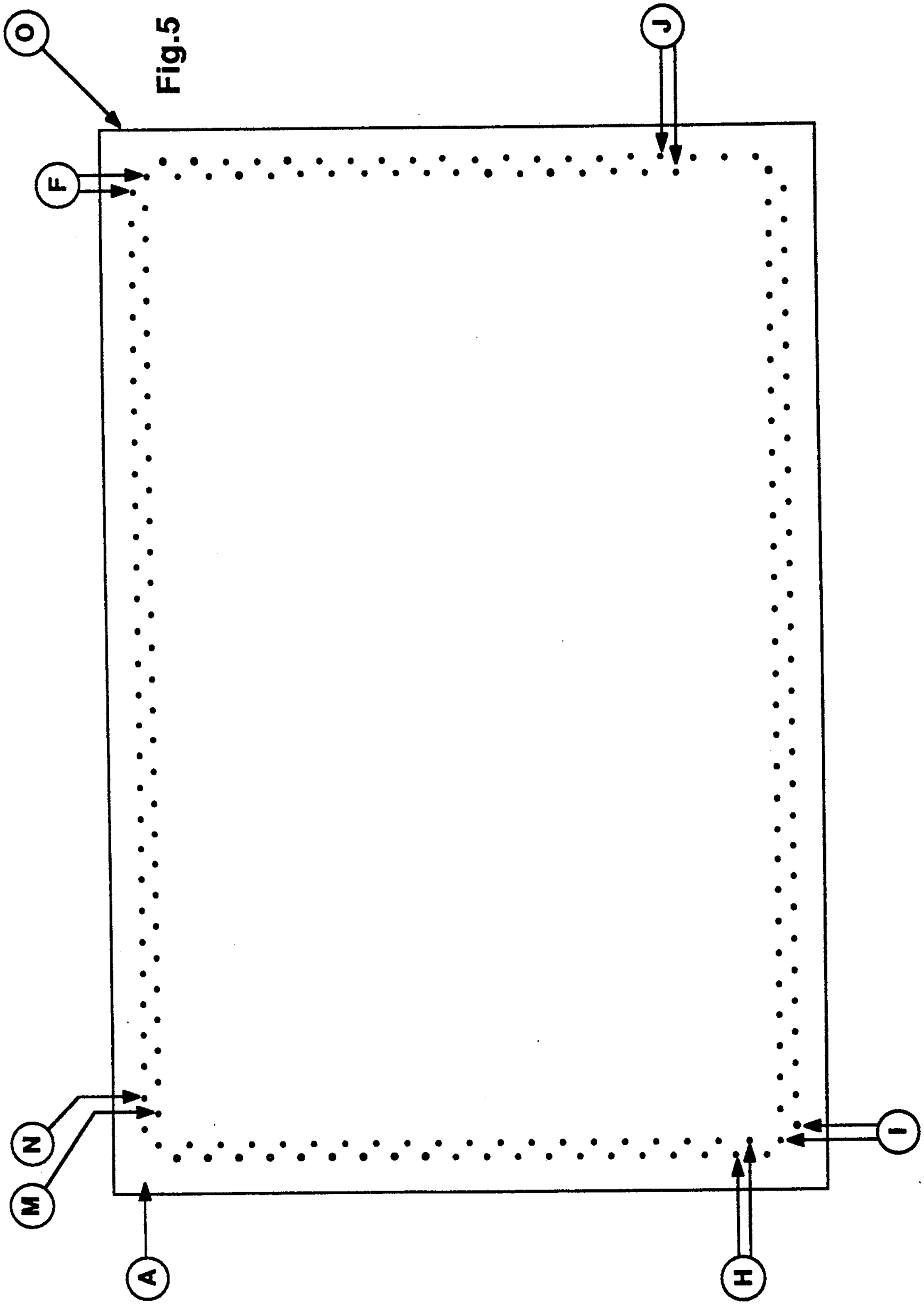
FIG. 5 is a plan view of the device showing only the double rows of small holes, spaced in 3" increments in ½" scale, which are cut out of the plastic.
Figure 6:
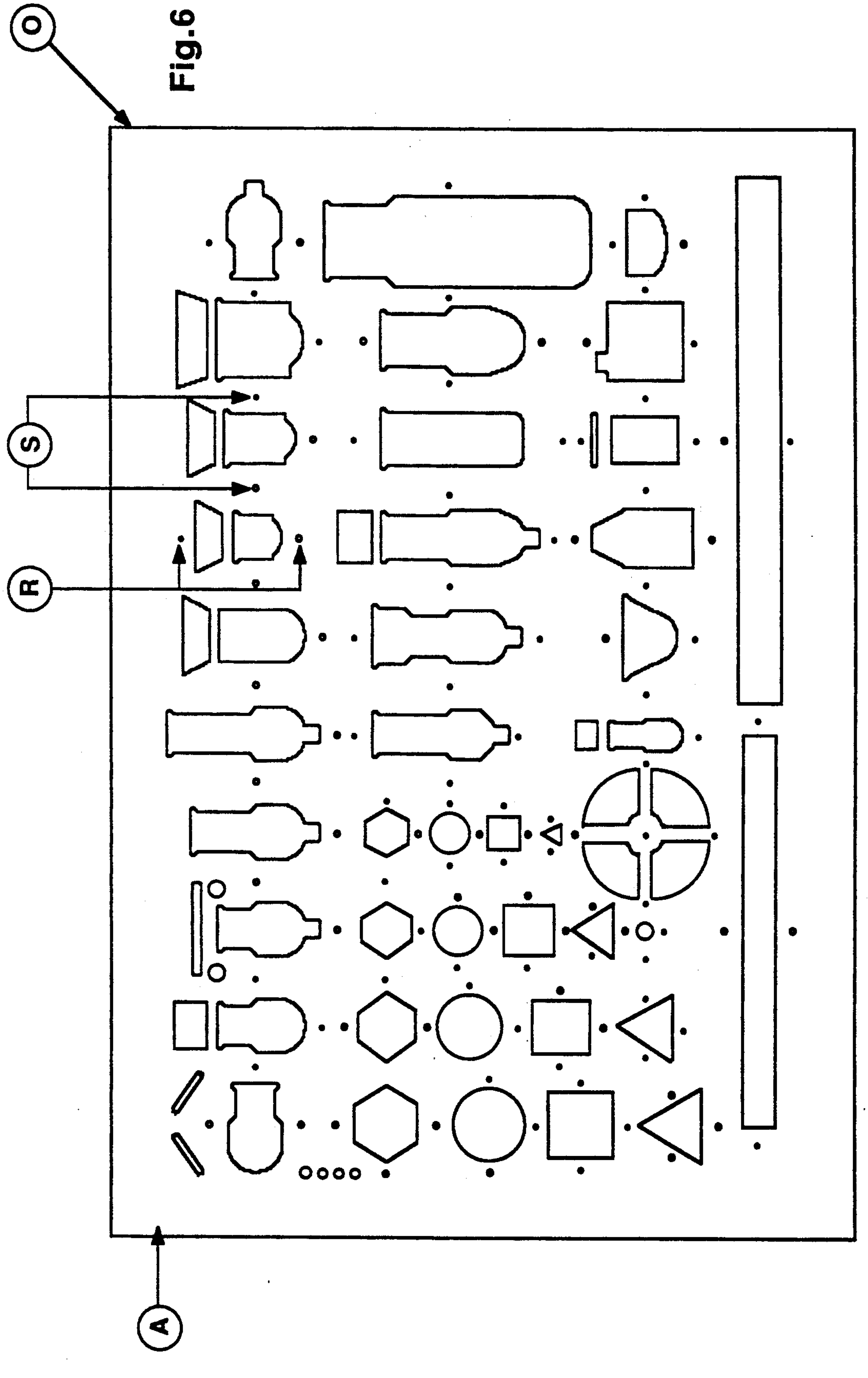
FIG. 6 is a plan view of the device showing only the symbols, the horizontal axis holes, and the vertical axis holes, which are cut out of the plastic.
Figure 19:
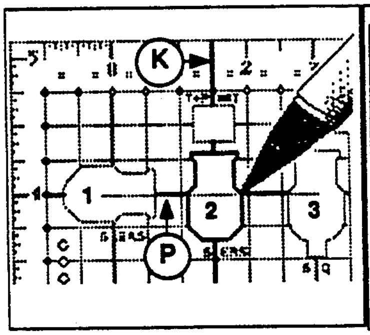
FIGS. 19-21 are expanded views of a portion of the device illustrating one method for drawing symbols 21" apart without having to first mark the centers of the symbols.
Figure 20:
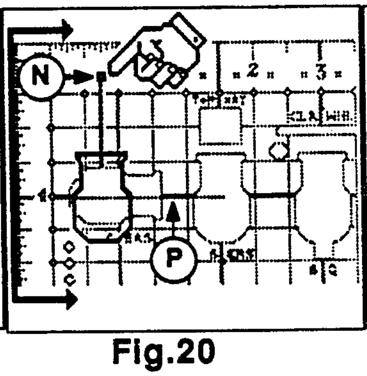
Figure 21:
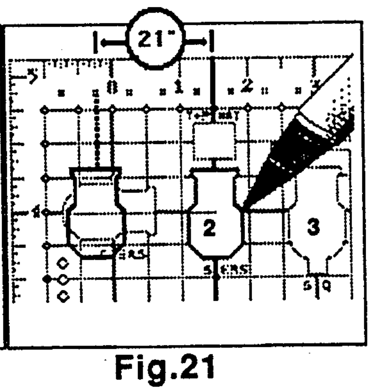

To draw symbols with a predefined distance of 21" without marking centers or requiring additional measuring devices, the procedure is as follows. Draw a line using a pen or pencil against the top edge of the template 0, to define a plane or central axis on a piece of paper. Referring to FIG. 19, raise the template so that horizontal axis line P overlays the drawn line, and draw the shape of symbol 2, which is aligned with bold vertical line K. Referring now to FIG. 20, slide the template to the right, so the vertical center of drawn symbol 2 is aligned with the small hole N, while horizontal axis line P still overlays the drawn line. Referring now to FIG. 2!, draw a second shape of symbol 2, which is now centered on the same axis and prespaced 21" from the first drawn symbol 2.

EXAMPLE 3

DETERMINING THE VERTICAL AXIS OF A SYMBOL, WITHOUT MAKING A MARK INSIDE THE ARC OF THE SYMBOL

Figure 22:
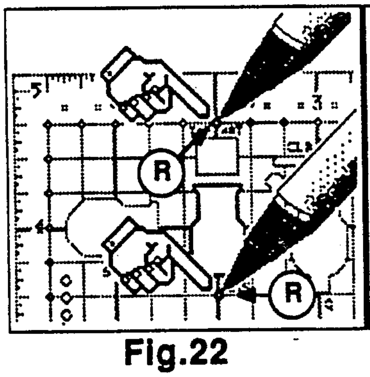
FIG. 22 is an expanded view of a portion of the device illustrating one method for using the small holes above and below each symbol to define the horizontal axis.

Draw a line using a pen or pencil against the top edge of the template 0, to define a plane or central axis on a piece of paper. Referring to FIG. 22, place the pen or pencil in the small holes R above and below the symbol making two small dots. These dots now define the vertical axis of the symbol.

EXAMPLE 4

DETERMINING THE HORIZONTAL AXIS OF A SYMBOL, WITHOUT MAKING A MARK INSIDE THE ARE OF THE SYMBOL

Figure 23:
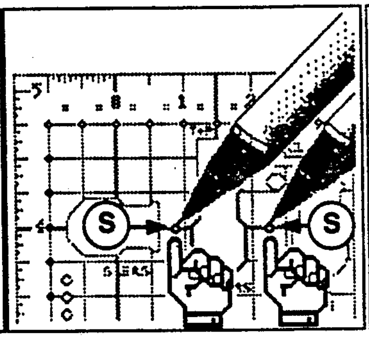
FIG. 23 is an expanded view of a portion of the device illustrating one method for using the small holes on either side of each symbol to define the vertical axis.

Draw a line using a pen or pencil against the top edge of the template 0, to define a plane or central axis on a piece of paper. Referring to FIG. 23, place the pen or pencil in the small holes S on the left and right sides of the symbol, making two small dots. These dots now define the horizontal axis of the symbol.

EXAMPLE 5

DRAWING SYMBOLS AT A 45° ANGLE WITHOUT ADDITIONAL EQUIPMENT

Figure 24:
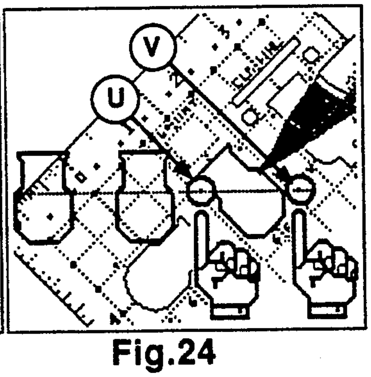
FIG. 24 is an expanded view of a portion of the device illustrating one method of rotating the device to align the small black dots onto a drawn line and draw a symbol at a 45° angle.

Draw a line using a pen or pencil against the top edge of the template 0, to define a plane or central axis on a piece of paper. Referring to FIG. 24, rotate the template so the small black dots U and V are aligned with the drawn line. A symbol can now be drawn at a 45° angle.

Figure 25:
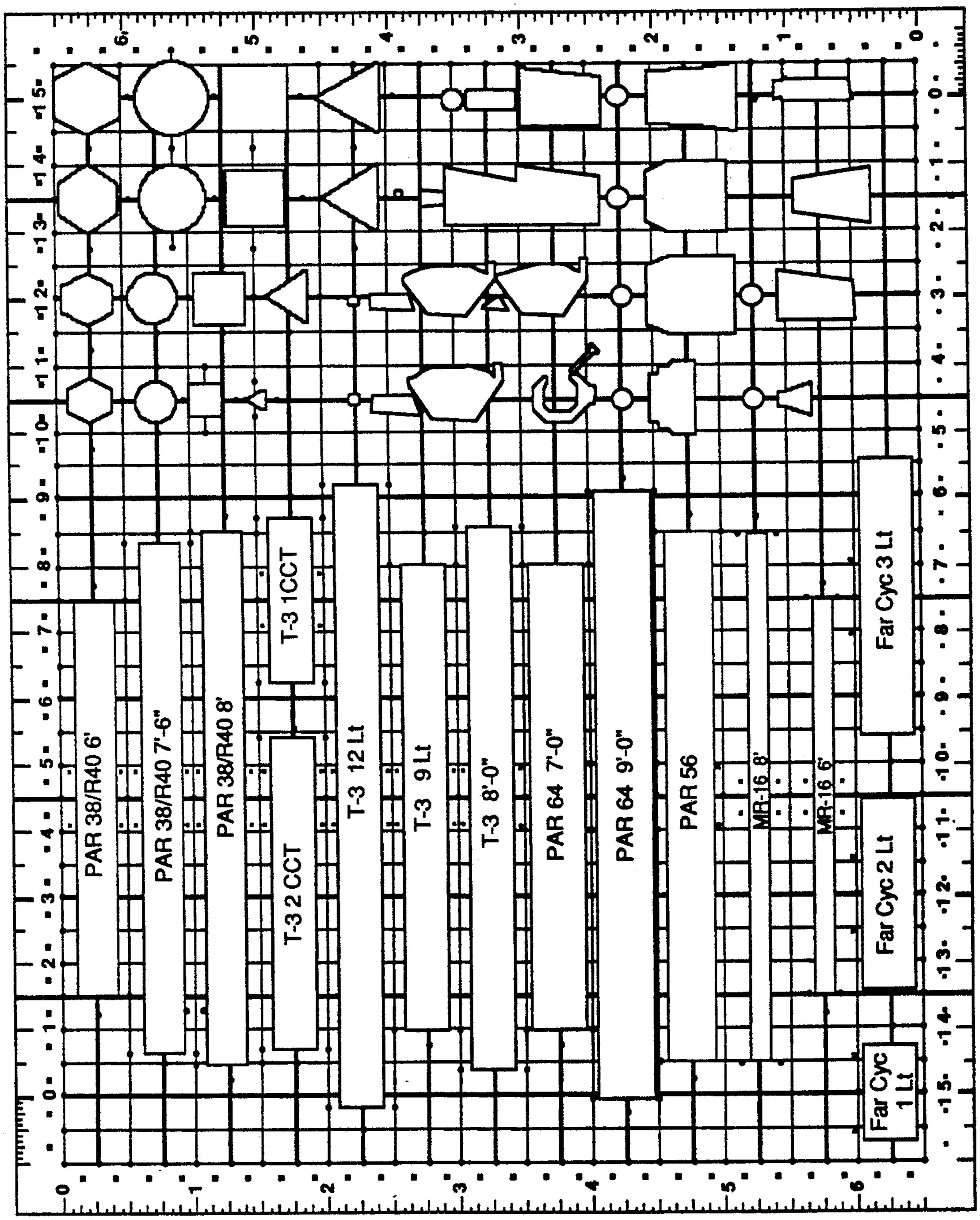
FIGS. 25 and 26 are illustrations of additional templates according to the invention.
Figure 26:
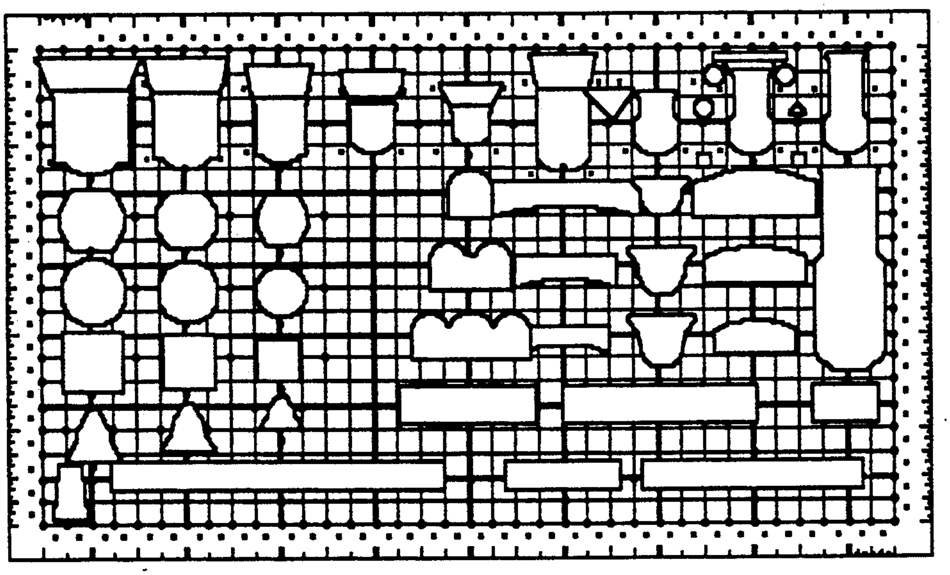

FIGS. 25 and 26 illustrate additional lighting templates in accordance with the teachings of the invention. As noted above, the invention can be used for templates for other objects, if desired.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A template for the drafting and spacing of symbols, which comprises:

a generally planar member adapted to be disposed on a substrate and defining a plurality of apertures forming symbols therein;

first means superimposed about said symbols for determining the spacing between said symbols according to a first predetermined scale;

first registration means associated with and positioned about each of said symbols for selective orientation of each said symbol at a predetermined angle; and second registration means associated with and positioned about each of said symbols for selective alignment of one symbol at a predetermined distance with respect to an adjacent symbol.

2. The template of claim 1 wherein said planar member is transparent and has a substantially rectangular perimeter.

3. The template of claim 2 wherein said perimeter includes means for determining distance thereof.

4. The template of claim 3 wherein said distance determining means extends in opposite directions on opposite sides of said rectangular perimeter.

5. The template of claim 1 further comprising second means for determining the spacing between said symbols according to a second predetermined scale.

6. The template of claim 5 wherein said second spacing determining means comprises a plurality of apertures in said planar member.

7. The template of claim 6 wherein said apertures are aligned in two staggered rows and wherein said second predetermined scale is smaller than said first predetermined scale.

8. The template of claim 1 wherein said first spacing determining means includes a plurality of linear indicia.

9. The template of claim 8 wherein said linear indica includes a plurality of horizontal and vertical lines.

10. The template of claim 9 wherein some of the horizontal and vertical lines are wider than the remaining lines.

11. The template of claim 1 wherein said second registration means comprises a plurality of apertures oriented about said symbols.

12. The template of claim 1 wherein said first registration means comprises a plurality of indicia oriented about said symbols.

13. The template of claim 12 wherein said indicia are positioned between adjacent symbols such that at least one of said indicia serves two adjacent symbols.

14. A template for the drafting and spacing of symbols, which comprises:

a generally planar member adapted to be disposed on a substrate and defining a plurality of apertures forming symbols therein;

first means for determining the spacing between said symbols according to a first predetermined scale;

first registration means associated with and positioned about each of said symbols for selective orientation of each said symbol at a predetermined angle; and second registration means associated with and positioned about said plurality of symbols for selective alignment of one symbol at a predetermined distance with respect to an adjacent symbol;

wherein said second registration means comprises a plurality of apertures oriented about each of said symbols with at least one of said apertures being positioned between adjacent symbols such that a single aperture serves two adjacent symbols.

15. A template for the drafting and spacing of symbols, which comprises:

a generally planar transparent member having four external edges forming a rectangle which is adapted to be disposed on a substrate and defining a plurality of cut out symbols therein;

a grid pattern upon said template, in a predetermined scale, with a first spacing between symbols represented by first lines, and a second spacing of smaller increments within the first spacing being represented by second lines, said first lines being wider than said second lines;

a scale upon a first edge of said template for defining the predetermined scale illustrated by said grid pattern;

double rows of apertures cut out of said template, located at said first edge of said grid pattern, in a predetermined scale, representing further smaller spacing increments within said first spacing between said symbols;

four indicia at 45°, 135°, 225°, and 315° arranged about each symbol, each opposite pair of indicia defining the rotation of said template required to draw a symbol at an angle of 45° or multiples thereof without additional devices; and four apertures at 0°, 90°, 180°, and 270° arranged about each symbol for defining the vertical and horizontal axis of said symbol and for selective alignment of said symbol at a predetermined distance with respect to an adjacent symbol.

16. The template of claim 15 wherein said perimeter includes means for determining distance thereof.

17. The template of claim 16 wherein said distance determining means extends in opposite directions on opposite sides of said perimeter.

18. The templates of claim 15 wherein said apertures are positioned between adjacent symbols such that a single aperture serves two adjacent symbols.

19. The template of claim 15 wherein said indicia are positioned between adjacent symbols such that at least one of said indicia serves two adjacent symbols.

20. The template of claim 15 wherein said symbols represent theater lighting fixtures.

* * * * *